United States Patent [19]
Paul

[11] 3,773,095
[45] Nov. 20, 1973

[54] CONICALLY MOLDED AND SLOT-FORMED INNER TUBE FOR TIRES

[75] Inventor: Richard H. Paul, Indianapolis, Ind.
[73] Assignee: Uniroyal, Inc., New York, N.Y.
[22] Filed: July 8, 1971
[21] Appl. No.: 160,849

[52] U.S. Cl.................................. 152/349, 156/118
[51] Int. Cl.............................................. B60c 5/04
[58] Field of Search............................ 264/94, 326; 152/349; 156/118, 122

[56] References Cited
UNITED STATES PATENTS
2,592,724  4/1952  O'Neil................................. 152/349
1,362,594  12/1920  Berger et al. ....................... 152/349
534,619  2/1895  Shaw.................................... 156/118

Primary Examiner—Gerald M. Forlenza
Assistant Examiner—Richard A. Bertsch
Attorney—Norbert Holler

[57] ABSTRACT

The invention relates to the field of manufacturing inner tubes for use in pneumatic tires, and more specifically relates to the production of an improved inner tube that is conically molded in slot form to obtain certain dimensional ratios in its uninflated condition that permit inflation to the usual toroidal form with minimal deviation in wall thickness so as to achieve a higher quality inner tube at a lower overall cost.

7 Claims, 3 Drawing Figures

Patented Nov. 20, 1973 3,773,095

INVENTOR.
RICHARD H. PAUL

CONICALLY MOLDED AND SLOT-FORMED INNER TUBE FOR TIRES

RELATED APPLICATIONS

None.

BACKGROUND OF THE INVENTION

This invention relates to the art of inner tubes that are manufactured for use within pneumatic tires.

Inner tubes have long been used in the art of pneumatic tires for the purpose of providing an air impervious chamber that may be received within the casing of the tire so as to maintain an adequate air supply within the tire during normal operating conditions.

DESCRIPTION OF THE PRIOR ART

Over the years varied types of equipment have been produced and various methods employed for manufacturing inner tubes of the type herein being discussed.

However, one of the best known methods of manufacturing inner tubes is set forth in Hinman U.S. Pat. No. 2,423,147 wherein the tube material is extruded in tube-like fashion and then supported over an array of rollers so as to be delivered to a table where the same may be cut into a segment of appropriate length.

The segment thus cut is then spliced together, provided with an inflation valve, and cured to a final condition, at which time it is ready for use within a tire casing.

In the prior art known to applicant, it has long been considered most expedient to lay the extruded tubing, for example, in a flat configuration and then splice the ends together so that the tube may move from this flat condition to a toroidal condition.

In doing this, however, it has been found that uneven stretching of the tube results when the same is inflated to toroidal condition, with some wall sections being stressed greater than other wall sections so as to, in effect, create inherent weaknesses in localized regions of the tube.

SUMMARY OF THE INVENTION

Applicant has discovered that if the tube is molded in a conical configuration and is further molded in the form of a slot rather than the characteristic toroid that has been known in the prior art, that improved results will occur.

Further, the applicant has discovered that there is a definite correlation between the thickness or minor axis of the slot and the cross-sectional diameter that is to be obtained upon inflation to toroidal configuration. By making the thickness of the slot small with respect to the cross-sectional diameter of the tube in its inflated condition, there is provided a formed conical tube that has a lesser internal volume to be pressurized and exhausted during the molding, with the result that the same can be molded in a shorter time. In actual practice, the total molding cycle time has been reduced by as much as 37 percent.

The small ratio of slot thickness to cross-sectional diameter also makes possible the minimizing of stretch as the uncured tube is changed from the extruded shape to the molded shape. This produces a much more uniform tube regarding the wall thickness and virtually eliminates splice defects.

Previous attempts to make tubes of this nature were unsuccessful because of excessive thinning at the crown (outer circumference) and rim (inner circumference) folds of the tube. The degree of thinning at the folds (which is the same as saying "at the ends of the slot") was found to be dependent upon the ratio of slot thickness (minor axis) to slot perimeter (slot perimeter being the same as $\pi$ times the cross-sectional diameter of the toroidal configuration). It was found that tubes could be most successfully manufactured when this ratio was in the range of about 0.05 to 0.09.

Production of an improved conical tube utilizing certain dimensional correlations as above noted accordingly becomes the principal object of this invention, with other objects of the invention becoming more apparent upon a reading of the following brief specification considered and interpreted in view of the accompanying drawings.

Figure 1:
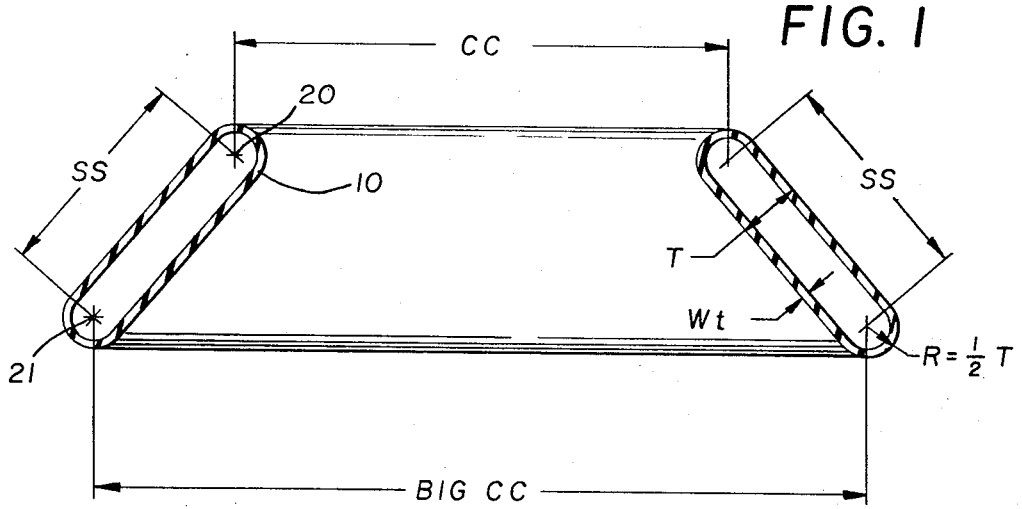
FIG. 1 is a cross-sectional profile view of the improved inner tube in its conically formed, slot cured configuration.

Referring now to the drawings and in particular to FIG. 1 thereof, the improved inner tube in its molded state, generally designated by the numeral 10, is shown as being frusto-conical in shape and as having a curved-end slot configuration in cross-section. In FIG. 1, the dimension SS indicates the length of each of the straight side walls of the tube 10 in the cross-sectionally slot-shaped configuration thereof (SS is also the distance between the centers of curvature 20 and 21 of the curved end walls of the tube at either end of the slot-shaped cross-section), while the dimensions CC and BIG CC indicate the diameters of the smaller and larger bases, respectively, of a frustum of a cone the generatrix of which is a straight line connecting the said centers of curvature. The tube 10 has a wall thickness indicated by the letters Wt, with the width or small axis of the slot being indicated by the letter T. R is the radius of the curved ends and is shown as being equal to ½ T. The slot-shaped cross-section thus has a perimeter consisting of two straight sides of length SS each and two semicircular ends with outer surfaces of radius R each.

Figure 2:
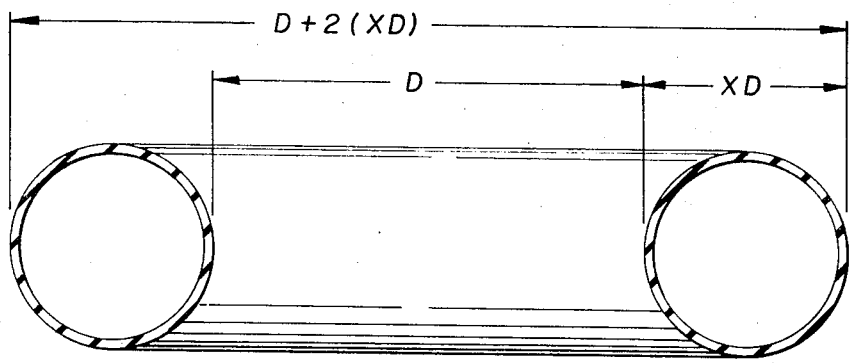
FIG. 2 is a similar sectional view but showing the improved tube rounded out to its toroidal shape.

Referring next to fIG. 2, it will be noted that this figure shows the tube 10 after the introduction of a volume of air sufficient to cause the tube to fill out to a toroidal shape. The tube in this form has the overall inner or base diameter D, and cross-sectional outer diameter XD, required for proper functioning and accommodation within the tire for which it has been designed.

By way of illustrating the dimensional correlation between the slot formed tube (FIG. 1) and the inflated toroidal tube (FIG. 2), attention is directed to the following dimensional correlations between the inflated tube having a base diameter D and a cross-sectional outer diameter XD. In such a case, the length P of the perimeter of the slot-shaped cross-section of the tube both in its uninflated and in its inflated condition is expressed by the relation $$P = \pi (XD)$$

(1)

the lengths CC and BIG CC, as those terms are herein defined, are expressed by the relations $$CC = D + T \quad (2)$$

and $$BIG\ CC = D + 2(XD) - T \quad (3)$$

and the linear distance SS between the centers of curvature 20 and 21 and thus also the length of each straight side of the cross-sectionally slot-shaped tube in its frusto-conical condition is expressed by the relation $$SS = (\pi/2)\ [(XD)-T] \quad (4)$$

It will be apparent that the foregoing relations define the inner tube as molded in terms of the toroidal dimensions it must assume to perform properly in its intended application.

When the interior volume of the new tube (which conforms to the foregoing math) is made to equal that of the properly sized toroidal tube by the introduction of air, the shape of the new tube will approximate the shape of the conventional toroidal tube.

It has been further calculated that when the tube moves from an uninflated position of FIG. 1 to the inflated position of FIG. 2 that the compression (value less than 1.000) and extension (value greater than 1.000) at 5° increments around the entire cross section of the tube are minimal, as reflected in the accompanying chart where a value of 1.053, for instance, means that that particular part of the tube has stretched 5.3 percent. Table I shows that neither the extension nor the compression exceeds 10 percent.

TABLE I

| DEGREES | TOP HALF | BOTTOM HALF |
|---|---|---|
| 5 | 0.995 | 0.995 |
| 10 | 0.981 | 0.981 |
| 15 | 0.962 | 0.969 |
| 20 | 0.943 | 0.959 |
| 25 | 0.928 | 0.952 |
| 30 | 0.920 | 0.948 |
| 35 | 0.918 | 0.946 |
| 40 | 0.919 | 0.946 |
| 45 | 0.921 | 0.948 |
| 50 | 0.925 | 0.952 |
| 55 | 0.931 | 0.957 |
| 60 | 0.937 | 0.963 |
| 65 | 0.944 | 0.970 |
| 70 | 0.952 | 0.978 |
| 75 | 0.961 | 0.986 |
| 80 | 0.970 | 0.995 |
| 85 | 0.979 | 1.003 |
| 90 | 0.987 | 1.053 |
| 95 | 0.996 | 1.012 |
| 100 | 1.004 | 1.028 |
| 105 | 1.011 | 1.036 |
| 110 | 1.018 | 1.042 |
| 115 | 1.024 | 1.048 |
| 120 | 1.029 | 1.53 |
| 125 | 1.033 | 1.057 |
| 130 | 1.036 | 1.059 |
| 135 | 1.038 | 1.060 |
| 140 | 1.038 | 1.060 |
| 145 | 1.037 | 1.059 |
| 150 | 1.034 | 1.056 |
| 155 | 1.030 | 1.049 |
| 160 | 1.025 | 1.036 |
| 165 | 1.018 | 1.023 |
| 170 | 1.010 | 1.011 |
| 175 | 1.002 | 1.002 |
| 180 | 1.000 | 1.000 1.012 1.020 |

It was found that deviation from the described dimensional pattern sufficient to effect compression or extension in excess of 10% would result in a tube that would not round out to the toroidal shape desired for proper fit within the tire. Allowable deviation for any one of the defined dimensions was found to be on the order of 5 percent (+ or −).

The following representative calculation set forth in Table II below shows similar data for an experimental tube which met all requirements specified for the new tube except that BIG CC was 7.7 percent less than the value thereof determined by equation (3). It will be noted that the maximum extension in such tube is about 13 percent, which is greater than the preferred maximum of 10 percent.

TABLE II

| DEGREES | TOP HALF | BOTTOM HALF |
|---|---|---|
| 5 | 0.991 | 0.991 |
| 10 | 0.971 | 0.981 |
| 15 | 0.951 | 0.973 |
| 20 | 0.942 | 0.967 |
| 25 | 0.939 | 0.964 |
| 30 | 0.939 | 0.964 |
| 35 | 0.941 | 0.965 |
| 40 | 0.944 | 0.968 |
| 45 | 0.949 | 0.973 |
| 50 | 0.956 | 0.979 |
| 55 | 0.963 | 0.987 |
| 60 | 0.972 | 0.996 |
| 65 | 0.982 | 1.005 |
| 70 | 0.992 | 1.015 |
| 75 | 1.002 | 1.026 |
| 80 | 1.013 | 1.037 |
| 85 | 1.025 | 1.048 |
| 90 | 1.035 | 1.059 |
| 95 | 1.046 | 1.070 |
| 100 | 1.057 | 1.080 |
| 105 | 1.066 | 1.089 |
| 110 | 1.075 | 1.098 |
| 115 | 1.084 | 1.107 |
| 120 | 1.091 | 1.114 |
| 125 | 1.097 | 1.120 |
| 130 | 1.102 | 1.125 |
| 135 | 1.106 | 1.128 |
| 140 | 1.108 | 1.130 |
| 145 | 1.109 | 1.131 |
| 150 | 1.108 | 1.130 |
| 155 | 1.106 | 1.128 |
| 160 | 1.103 | 1.124 |
| 165 | 1.098 | 1.113 |
| 170 | 1.091 | 1.096 |
| 175 | 1.083 | 1.083 |
| 180 | 1.081 | 1.081 |

A tube having the above characteristics would not assume a proper toroidal shape upon inflation. The excessive tension developed in the crown area (associated with the 13 percent extension) would cause the rim area to buckle and wrinkle. Such a tube could not be used in a pneumatic tire.

Figure 3:
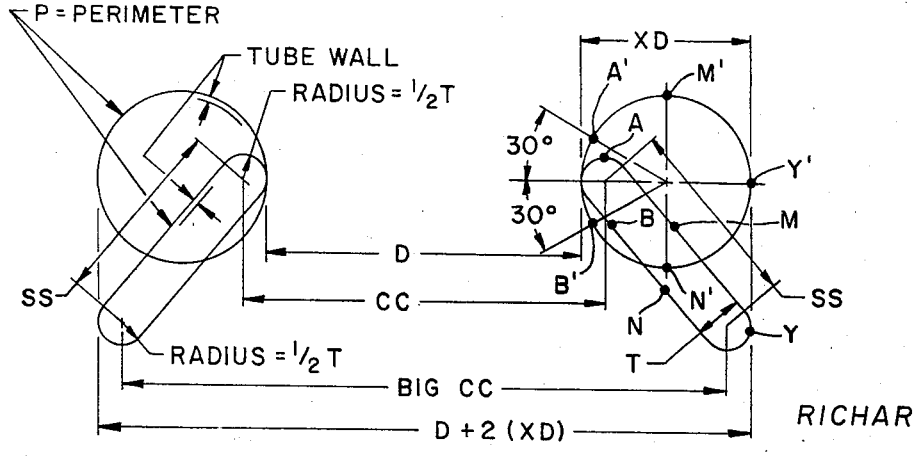
FIG. 3 is a similar sectional view but showing the improved tube and its toroidal counterpart as being superimposed one upon the other.

FIG. 3 gives further explanation of what happens when the new tube rounds out to the desired toroidal configuration. Here the new tube and its toroidal counter-part are shown, one super-imposed on the other. Assume that this depicts the tube corresponding to the data contained in Table I. When air is introduced into the new tube, the slot-shaped cross-section will round out until it coincides with the circular cross-section of the toroidal shape (their perimeters are equal in length). The point at the end of diameter D is the same point for both the slot and the circle. This point will remain fixed. Point A will move to point A'; and since Point A is at the end of a bigger diameter than point A', compression must occur in this element of the tube as A moves to A'. From Table I, (see 30°) this compression in the top half amounts to 8 percent, i.e., 1.000 − 0.920 = 0.08. In the bottom half, at 30° away from the rim position, compression would amount to 5.2 percent as B moves to B'. At 90° in the top half, M will move to M' with 1.3 percent compression. In the bottom half at 90°, N will move to N' with 1.2 percent stretch. At 180°, Y will move to Y' with zero percent change. A change in area of X percent over a given element of tube wall area produces an average of X percent change in tube wall thickness over that area. Extension produces thinning and compression results in thickening.

While a full and complete description of the invention has been set forth in accordance with the dictates of the Patent Statutes, it is to be understood that the invention is not intended to be limited to the specific embodiments hereto set forth.

Accordingly, modifications of the invention may be resorted to without departing from the spirit hereof or the scope of the appended claims.

What is claimed is:

1. A molded inner tube, said inner tube being molded so as to have, when it its uninflated state, (a) the overall shape of an annular frustum of a cone and (b) in radial cross-section at any part of the cone the shape of an elongated slot with substantially parallel side walls and circularly curved end walls, said inner tube being adapted to be inflated from its conically molded and slot-formed condition to its ultimate generally toroidal condition and being dimensioned in such a manner that any variation in the wall thickness of said inner tube engendered by the inflation thereof does not exceed about 10 percent of the starting wall thickness of said inner tube in its uninflated state.

2. An inner tube according to claim 1, wherein the dimensional characteristics of said inner tube satisfy the relation $$SS = (\pi/2) [(XD) - T]$$

where $SS$ is the length of each of said parallel side walls of said inner tube when uninflated and slot-shaped in cross-section and also the distance between the respective centers of curvature of said end walls, $T$ is the distance between said parallel side walls, and $XD$ is the cross-sectional outer diameter of said inner tube when the latter is inflated to its toroidal condition.

3. An inner tube according to claim 1, wherein the ratio of the wall thickness of said inner tube when uninflated to the wall thickness thereof when inflated is between about 0.90 and about 1.10.

4. An inner tube according to claim 1, wherein the dimensional characteristics of said inner tube satisfy the relation $$\text{BIG } CC = D + 2(XD) - T$$

where BIG $CC$ is the diameter of the larger base of a frustum of a cone the generatrix of which is a line connecting the respective centers of curvature of said end walls of said slot-shaped cross-section, $D$ is the overall inner or base diameter of said inner tube when the same is inflated to its toroidal condition, $XD$ is the cross-sectional outer diameter of said inner tube when the same is inflated to its toroidal condition, and $T$ is the distance between said parallel side walls of said inner tube when the same is uninflated and slot-shaped in cross-section.

5. An inner tube according to claim 1, wherein the dimensional characteristics of said inner tube satisfy the relation $$CC = D + T$$

where $CC$ is the diameter of the smaller base of a frustum of a cone the generatrix of which is a line connecting the respective centers of curvature of said end walls of said slot-shaped cross-section, $D$ is the overall inner or base diameter of said inner tube when the same is inflated to its toroidal condition, and $T$ is the distance between said parallel side walls of said inner tube when the same is uninflated and slot-shaped in cross-section.

6. An inner tube according to claim 1, wherein the ratio of the distance between said parallel side walls of said inner tube when the same is uninflated and slot-shaped in cross-section to the length of the cross-sectional periphery of said inner tube when the same is inflated to its toroidal condition is between about 0.05 and about 0.09.

7. An inner tube according to claim 1, wherein the dimensional characteristics of said inner tube satisfy the relations $$CC = D + T$$

$$\text{BIG } CC = D + 2(XD) - T$$

$$SS = (\pi/2) [(XD) - T]$$

where $CC$ and BIG $CC$ are the diameters of the smaller and larger bases, respectively, of a frustum of a cone the generatrix of which is a line connecting the respective centers of curvature of said end walls of said slot-shaped cross-section, $D$ is the overall inner or base diameter of said inner tube when the same is inflated to its toroidal condition, $T$ is the distance between said parallel side walls of said inner tube when the same is uninflated and slot-shaped in cross-section, $XD$ is the cross-sectional outer diameter of said inner tube when the same is inflated to its toroidal condition, and $SS$ is the length of each of said parallel side walls and also the distance between said centers of curvature.

* * * * *

UNITED STATES PATENT OFFICE
CERTIFICATE OF CORRECTION

Patent No. 3,773,095                    Dated November 20, 1973

Inventor(s) Richard H. Paul

It is certified that error appears in the above-identified patent and that said Letters Patent are hereby corrected as shown below:

In Table I, under the heading BOTTOM HALF:

At the 90 degree line, insert -1.012- in the empty space.

At the 95 degree line, "1.012" should read -1.020-.

At the 120 degree line, "1.53" should read -1.053-.

At the 180 degree line, "1.020" should read -1.000-.

At the 180 degree line, delete the numerals "1.000" and "1.012" appearing between columns TOP HALF and BOTTOM HALF.

At the top of column 4, delete the numeral "1.053."

Signed and sealed this 24th day of December 1974.

(SEAL)
Attest:

McCOY M. GIBSON JR.                C. MARSHALL DANN
Attesting Officer                  Commissioner of Patents